United States Patent [19]
Corbalis et al.

[11] Patent Number: 5,999,524
[45] Date of Patent: Dec. 7, 1999

[54] DIAL ACCESS SWITCHING INTERFACE FOR FRAME RELAY

[75] Inventors: Charles Corbalis, Saratoga; Muthu Muthuraman, Cupertino; Syed Rahman, San Jose; Paul Farah, Santa Clara; Shyla Bearelly; Gary L. Beckstrom, both of Sunnyvale, all of Calif.

[73] Assignee: Cisco Technology, Inc., San Jose, Calif.

[21] Appl. No.: 08/660,454

[22] Filed: Jun. 7, 1996

[51] Int. Cl.[6] .............................. H04Q 11/04; H04J 3/24
[52] U.S. Cl. ..................... 370/352; 370/522; 370/410
[58] Field of Search ................................ 370/351, 352, 370/389, 395–397, 400, 410, 419, 420, 422, 426, 464, 468, 471, 474, 522, 524, 401, 402

[56] References Cited

U.S. PATENT DOCUMENTS

| | | | |
|---|---|---|---|
| 5,473,679 | 12/1995 | La Porta et al. | 370/410 |
| 5,490,140 | 2/1996 | Lai et al. | 370/352 |
| 5,490,141 | 2/1996 | Lai et al. | 370/352 |
| 5,521,914 | 5/1996 | Mavraganis et al. | 370/352 |
| 5,586,261 | 12/1996 | Brooks et al. | 370/401 |
| 5,638,359 | 6/1997 | Peltola et al. | 370/229 |

OTHER PUBLICATIONS

Uyless Black, "Frame Relay Networks, Specification and Implementations", *McGraw–Hill, Inc.,* Second Edition, Title pp. 1–2.

Uyless Black, "Frame Relay Networks, Specification and Implementations", *McGraw–Hill, Inc.,* Second Edition, Chapter 10, pp. 159–176.

Frame Relay Principles and Applications, Philip Smith, Aug. 1993.

*Primary Examiner*—Douglas W. Olms
*Assistant Examiner*—Seema S. Rao
*Attorney, Agent, or Firm*—Blakely, Sokoloff, Taylor & Zafman LLP

[57] ABSTRACT

A data communications system consists of a number of interconnected nodes forming a frame relay network. A user accesses the network by dialing in via a dial access server (DAS). The DAS-to-frame relay interface supports CCITT Recommundation Q.931 protocols for call control. A data link connection identifier (DLCI) for use in the DAS-to-frame relay network interface is provided in a Q.931 call establishment message.

5 Claims, 2 Drawing Sheets

# DIAL ACCESS SWITCHING INTERFACE FOR FRAME RELAY

FIELD OF THE INVENTION

The present invention relates generally to the field of packet switching network communications and, more specifically, to the provision of dial access to such a network.

BACKGROUND

Attempts to transfer data more efficiently than the traditional packet switching methods (e.g., X.25) have led to the development of a packet switching technique called frame relay. A frame relay network provides a number of interconnected nodes which are capable of receiving data frames from other network nodes and forwarding those data frames through to other network nodes to an ultimate destination. Nodes are interconnected by transmission paths, each of which supports one or more virtual circuits. Communication from one user to another can thus be made using the pre-defined network connections of the virtual circuits.

Frame relay networks support two types of virtual circuits: permanent virtual circuits (PVCs) and switched virtual circuits (SVCs). With a PVC service, the virtual circuit endpoints route through the frame relay network and PVC identifiers are determined when a user subscribes to the network. PVCs then are similar to leased lines in the sense that the physical connection is always present; call setup and teardown is implemented via commands issued by a network management system at subscription time. SVCs have been referred to as virtual circuits (VCs) "on demand". VCs on demand can be provided using dial access to a frame relay network, for example, from an ISDN network. For the case of offering frame relay services within the broader context of ISDN, a Specification of the International Telecommunications Union (ITU), Recommendation Q.933, provides a protocol for provisioning a virtual circuit "on demand". (The ITU was formerly known as the International Telegraph and Telephone Consultative Commitee or CCITT.)

According to the Q.933 protocol, a SETUP message is transmitted from the calling party to the network/called party. The Q.933 SETUP message specifies various frame relay connection parameters including the DLCI, bit rate, etc. and protocol parameters such as the frame ack window size, etc. Since this method is designed to operate over the ISDN B-channels or D-channel, the channel number element (required for the ISDN connection) is distinct from the DLCI element (required for the frame relay connection) in the SETUP message and both must be transmitted.

In the case of simple, pre-subscribed frame relay services the Q.933 method is relatively inefficient, given the additional protocol stack and the additional information elements required. It would, therefore, be desireable to have an improved method for providing dial access to pre-subscribed frame relay networks.

SUMMARY AND OBJECTS OF THE INVENTION

It is therefore an object of the present invention to provide a method for accessing a frame relay network via a dial-up connection without the use of the Q.933 protocol stack.

This and other objects of the invention are achieved by the use of an improved dial access interface to provide connection information for a frame relay network. In one embodiment, a frame relay network consists of a number of interconnected nodes. A user accesses the frame relay network by dialing in to the network. The DLCI for the user-to-frame relay network connection is specified in a Q.931 channel identification message element. In this way, the user is provided with dial access to the frame relay network.

Other objects, features and advantages of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A method and apparatus to allow dial access to a frame relay network is described. According to one embodiment, users are connected to the network via a dial-access server. The dial-access server-to-frame relay link supports CCITT Recommendation Q.931 protocols for call control. When a call is intiated, a data link connection identifier (DLCI) for the dial-access server-to-frame relay network interface is passed in a call establishment message.

Figure 1:
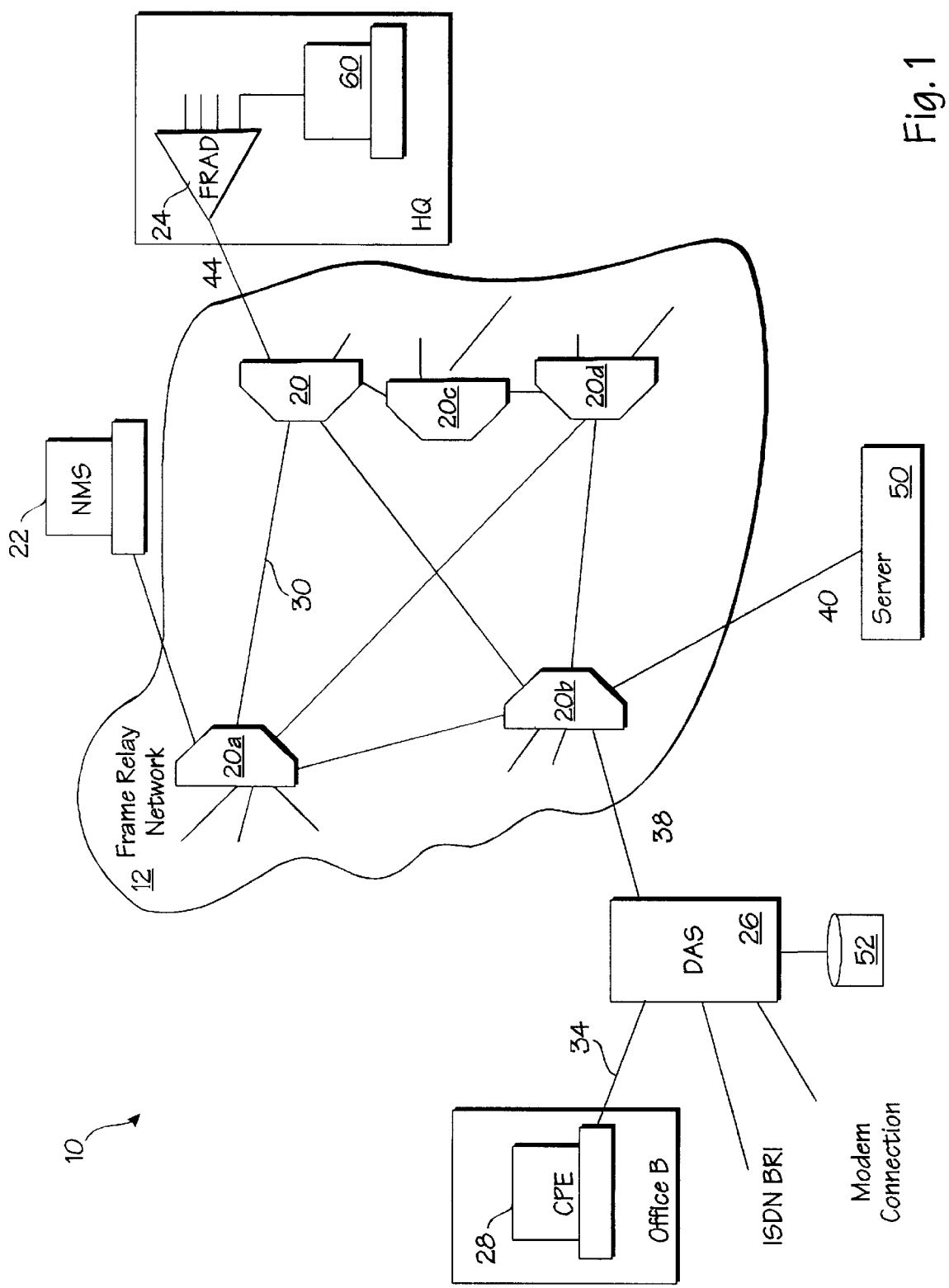
FIG. 1 illustrates a frame relay network configured to allow dial access in accordance with the present invention.

As shown in FIG. 1, a data communications system 10 includes a fully integrated frame relay network 12 having a variety of switching nodes 20–20d. Each node 20–20d is interconnected to other network nodes 20–20d by a variety of transmission paths 30. (Note that for clarity only one transmission path 30 has been labeled. Those skilled in the art will appreciate that all of the transmission paths between network nodes 20–20d are substantially similar.) Each transmission path 30 supports a number virtual circuits.

Access to frame relay network 12 is accomplished in a variety of ways. For example, a host 60 located at a central office HQ accesses frame relay network 12 via frame relay access device (FRAD) 24. FRAD 24 is coupled to a network node 20 via a leased line 44. FRAD 24 encapsulates transmitted data from host 60 into the frame relay format for transport through network 12. As is known by those skilled in the art, FRAD 24 may be embedded in a bridge, a router, a multiplexer, or other stand alone device. Alternatively, FRAD 24 may be an expansion card with frame relay access functionality which is found within the chassis of host 60.

The connection between the HQ and network 12 has been described as a leased line 44. This is more accurately a description of the physical connection into network 12. The logical connection is better described as a virtual circuit. That is, when host 60 has data to be transmitted, a circuit over leased line 44, through the network 12 and to a destination point will be available. This circuit is known in the art as a permanent virtual circuit (PVC). Because the physical circuit is not dedicated to only one PVC, other users of network 12 can transmit data over the same physical wires (or other transmission media) that may carry data between the HQ and the destination. The endpoints of the PVC are established at the time the HQ users subscribe to the network service and the parameters which define the circuit (e.g., the network nodes 20–20d, the ports of these nodes to be used, etc.) are stored in fixed tables in memory.

Some user situations may not require (in terms of the amount of data to be transferred) or justify (in terms of the cost) the use of private, dedicated access lines, such as leased line 44 or a nailed PVC, to access network 12. Rather, some users may only need access to network 12 on a sporadic basis. Alternatively, there are situations where leased line 44 may fail. To ensure that such a failure does not eliminate the availability of access to network 12, users at the HQ may need to lease additional lines to provide backup capabilities. These backup lines may only be used once in a great while, and otherwise may remain idle. Regardless of whether the backup lines are being used, however, the users incur the lease costs associated with the backup lines.

To avoid the need for such "backup leased lines" and to allow users that only require infrequent access to network 12 to do so, the present invention provides a means for dial access to network 12. Dial access, as the term implies, allows users to dial into frame relay network 12, much like the public switched telephone network allows users to dial in to the network to connect to other users. As further described below, those network nodes 20–20d which have dial-up ports available, allow users to access network 12 from any connected dial access server (I)AS) such as DAS 26. This may include users at a remote office, such as CPE 28 at Office B, or other users which have access to DAS 26 via modem connections (using V.32, V.34, etc.) or ISDN BRI connections. In addition, users will have dial access to network 12 in the event a leased line fails. This avoids the costs associated with leasing a backup line and also provides a means of gaining additional bandwidth on demand if circumstances so require. The manner in which dial access to network 12 is achieved will now be discussed.

CPE 28 at Office B has access to DAS 26 via link 34. DAS 26 is, in turn, coupled to network node 20b via dial access interface 38. The physical layer of dial access interface 38 may be any unchannelized link, for example, unchannelized T1 at 1.536 Mbps, unchannelized E1 at 1.984 Mbps, unframed E1 at 2.048 Mbps, or a higher speed serial interface. Dial access interface 38 supports CCITT Recommedation Q.931 protocols for call control.

When users at Office B wish to access frame relay network 12, a call is placed from CPE 28 to DAS 26 over link 34. A call session is established between CPE 28 and DAS 26 using techniques well known in the art (e.g., Q.931 call control protocols). It remains for DAS 26 to initiate a call to frame relay network 12.

When a DAS, such as DAS 26, commonly referred to as a calling party, initiates a call using Q.931 protocol, a SETUP message is transmitted from the calling party to the network/called party. This SETUP message typically includes information which the network needs to establish the call.

As is known in the art, user connections to frame relay network 12 are identified using a data link connection identifier (DLCI). A DLCI provides a local identifier for an end-to-end virtual connection (VC). Accordingly, in order to properly transfer messages between DAS 26 and network node 20b, a DLCI for user data must be established between DAS 26 and network node 20b. However, CCITT Reccommendation Q.931 does not provide for this contingency.

Nevertheless, in accordance with the present invention, call setup/tear down signalling between DAS 26 and node 20b is done via Q.931 signalling messages sent in frames corresponding to CCITT Recommendation Q.921 format. A predetermined signalling (control message) PVC is set up across the DAS 26-to-network node 20b link 38 exclusivly for the signalling frames. The Q.921 frames containing the signalling messages are exchanged across the DAS-to-frame relay network interface using an agreed-to data link connection identifier (DLCI).

According to the present invention, the local DLCI for the DAS-to-frame relay interface is passed as part of the call SETUP message as follows. DAS 26 presents the SETUP message, including a channel number message element. The channel number message element contains the DLCI number that the network node 20b will use to set up the connection at the local end. This access-port-to-DLCI mapping is done at DAS 26.

Those skilled in the art will appreciate that the channel number message element can be a single octet field or a variable length octet field. For the case where the message element is a single octet, an extension bit will be set to 1. In the case where the channel number message element is a variable length field, the extension bit will be set to 0. With the single octet form of the channel number message element, the DLCI range is from 0 through 127. Potentially more DLCIs can be supported by extending the channel number field by an additional byte using the variable length message element format, thus giving 14 bits for specifying the DLCI (i.e., 16383 possible values).

For purposes of the present invention, the SETUP message transmitted by DAS 26 also includes the calling party's automatic number identification (ANI) information. The ANI uniquely identifies the calling party and will allow for automatic provisioning of a circuit within frame relay network 12 as described below. The ANI is transmitted in accordance with the format specified by CCITT Recommendation Q.931. That is, the ANI is included as an information element transmitted during the establishment of the call.

For the situation depicted in FIG. 1, when a user at Office B wishes to communicate with the host 60 at the HQ via network 12, the user places a call from CPE 28 to establish a network connection. CPE 28 initiates a call via DAS 26. This call initiation includes the ANI of the CPE 28 interface to link 34. When DAS 26 receives the call from CPE 28, DAS 26 may perform a call authentication. This call authentication is performed by accessing an account validation data base 52. The account validation data base 52 stores records of valid user accounts and only allows authorized users to access frame relay network 12. If a user is not listed in account validation data base 52, no further call processing will be performed and the user will be informed that the account is invalid. The account validation data base 52 nay be accessed using the CPE 28 ANI information or other information transmitted during the call establishment phase.

Assuming the account validation data base 52 returns an "approved" message, the ANI from CPE 28 is transported to server 50. Server 50 is coupled to network node 20b by a transmission path 40. Transmission path 40 supports the logical connections required to transport signaling information, including the CPE 28 ANI, from network node 20b. It will be appreciated that although the signaling information from CPE 28 originally conformed to the format specified by the Q.931 Recommendation, the signaling information may have been reformatted to conform to another protocol supported by network node 20b and server 50. Regardless of this reformatting, the ANI information will still be present.

At server 50, the signaling information is decoded and the ANI for CPE 28 is retrieved. A processor (not shown) associated with server 50 uses this ANI to access a data base stored in a memory (not shown). The data base contains predefined circuit provisioning information for a number of users, including CPE 28. The ANI transmitted by CPE 28 is used to locate the appropriate circuit provisioning information (e.g., nodes, ports, etc.) that will allow CPE 28 to connect to host 60 at the HQ. This information will allow a virtual circuit to be established to connect CPE 28 to host 60. In other words, the network service has been pre-subscribed to allow CPE 28 to connect to host 60.

After the circuit provisioning information corresponding to the ANI associated with CPE 28 is retrieved from the data base, server 50 provides the circuit provisioning information to network management system (NMS) 22. NMS 22 receives the circuit provisioning information and automatically establishes the appropriate virtual connection (e.g., between network nodes 20b and 20). In this way, CPE 28 is connected to host 60 at the HQ.

Once a VC has been established (using the predefined connection information as discussed above), network node 20b informs DAS 26 of the successful connection using an appropriate Q.931 message (e.g., a CONNECT message) transmitted on the signalling channel. DAS 26 then completes; the user-to-network connection by logically patching the user data stream from CPE 28 to the frame relay data stream on the specified user DLCI. Disconnect requests are processed in a similar fashion, except that a call reference value (CRV) is used to identify the call instead of the ANI on the frame relay network 12.

Figure 2:
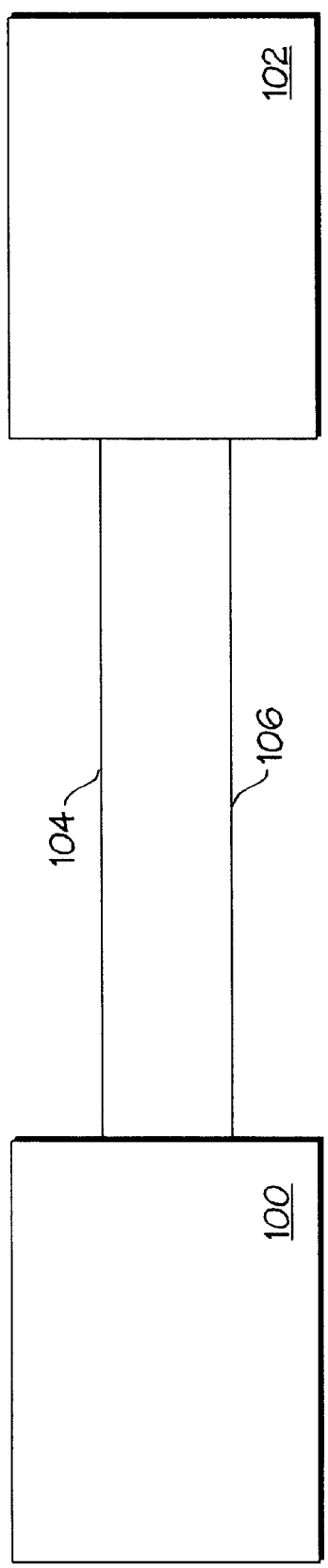
FIG. 2 illustrates an alternative user-to-network interface incorporating the present invention.

Referring now to FIG. 2, an alternative DAS-to-frame relay interface is shown. In this alternative, DAS 100 is connected to frame relay network node 102 via unchannelized link 104 and channelized link 106. Unchannelized link 104 is used to pass user data between DAS 100 and node 102 while channelized link 106 is used to pass signaling information between DAS 100 and node 102. According to the present invention channelized link 106 supports Q.931 protocols for call control. That is, call establishment messages are passed over channelized link 106. One such call establishment message includes the DLCI for the DAS 100-to-frame relay node 102 interface as described above. This DLCI is then used across the unchannelized link 104 when user data is passed between DAS 100 and node 102.

Thus, an efficient method for providing dial access to frame relay networks has been described. In the foregoing specification, the invention has been described with reference to specific exemplary embodiments thereof. It will, however, be clear that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:

transmitting from a frame relay network access device across a dial access link to a node within a frame relay network, the dial access link supporting CCITT Recommendation Q.931 protocols for call control, a Q.931 SETUP message having included therein a data link connection identifier (DLCI) and automatic number identification (ANI) information identifying a calling party;

setting up a connection between the node and the frame relay network access device using the DLCI; and automatically validating the calling party using the ANI information.

2. The method of claim 1 wherein the DLCI is included within a channel number message element of the SETUP message.

3. The method of claim 2 wherein the link is an unchannelized link.

4. The method of claim 2 wherein the link is a channelized link.

5. The method of claim 1 further comprising automatically provisioning a circuit within the frame relay network according to the ANI information.

* * * * *